US012610024B2

(12) United States Patent　　　(10) Patent No.: US 12,610,024 B2
Gal et al.　　　　　　　　　　　(45) Date of Patent: Apr. 21, 2026

(54) DYNAMIC BACKGROUND SELECTION IN A CHAT INTERFACE

(71) Applicant: Zoom Video Communications, Inc., San Jose, CA (US)

(72) Inventors: Oded Gal, Palo Alto, CA (US); Andrew Law, Los Gatos, CA (US); Sally Lu, Los Angeles, CA (US); Ping Luo, Pleasanton, CA (US); Sharvari Nerurkar, Redmond, WA (US); Archil Vardidze, Austin, TX (US); Zheng Yuan, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/472,664

(22) Filed: Sep. 12, 2021

(65) Prior Publication Data

US 2023/0082461 A1　　Mar. 16, 2023

(51) Int. Cl.
| | |
|---|---|
| *H04N 7/15* | (2006.01) |
| *G06F 3/0481* | (2022.01) |
| *G06F 3/0484* | (2022.01) |
| *H04L 12/18* | (2006.01) |
| *H04L 51/046* | (2022.01) |

(52) U.S. Cl.
CPC ........... H04N 7/157 (2013.01); G06F 3/0481 (2013.01); G06F 3/0484 (2013.01); H04L 12/1818 (2013.01); H04L 12/1831 (2013.01); H04L 51/046 (2013.01)

(58) Field of Classification Search
None
See application file for complete search history.

(56) References Cited

U.S. PATENT DOCUMENTS

| | | | | |
|---|---|---|---|---|
| 8,594,423 | B1 * | 11/2013 | Carpenter | ............... G06T 7/194 |
| | | | | 382/164 |
| 8,823,739 | B2 * | 9/2014 | Baron, Jr | ............ H04L 12/1818 |
| | | | | 345/632 |
| 9,232,189 | B2 * | 1/2016 | Shaburov | .............. H04L 65/403 |

(Continued)

FOREIGN PATENT DOCUMENTS

KR　　　20220101827 A　*　1/2021　.........　B60R 21/2037

OTHER PUBLICATIONS

Zoom Into June, May 22, 2020, Office Holidays, (https://blog. officeholidays.com/cultural-diversity/zoom-into-june/) (Year: 2020).*

(Continued)

*Primary Examiner* — William L Bashore
*Assistant Examiner* — Koorosh Nehchiri
(74) *Attorney, Agent, or Firm* — Kilpatrick Townsend & Stockton, LLP

(57) ABSTRACT

Methods and systems provide dynamic background selection in a chat interface. First, the system receives metadata about a chat session comprising a number of participants. The system then determines a virtual background based on one or more background selection criteria and at least a subset of the metadata about the chat session. Finally, the system displays, for each of the participants in the chat session, a spatial chat user interface including the determined virtual background, with the one or more spatialized avatars overlaid on the virtual background and positioned spatially within it.

20 Claims, 12 Drawing Sheets

(56)                    References Cited

U.S. PATENT DOCUMENTS

| | | | | |
|---|---|---|---|---|
| 10,944,921 | B2 * | 3/2021 | Punja | G06V 10/26 |
| 11,157,700 | B2 * | 10/2021 | Moskowitz | G06F 40/30 |
| 11,362,848 | B1 * | 6/2022 | Lin | H04N 7/157 |
| 11,921,970 | B1 * | 3/2024 | Hoover | G06F 3/017 |
| 2007/0082738 | A1 * | 4/2007 | Fickie | A63F 13/87 |
| | | | | 463/42 |
| 2012/0192088 | A1 * | 7/2012 | Sauriol | G06F 3/012 |
| | | | | 715/757 |
| 2014/0052794 | A1 * | 2/2014 | Tucker | H04L 51/063 |
| | | | | 709/206 |
| 2014/0115502 | A1 * | 4/2014 | Van Wie | H04L 65/403 |
| | | | | 709/204 |
| 2014/0181229 | A1 * | 6/2014 | Tucker | H04L 12/1827 |
| | | | | 709/206 |
| 2014/0320591 | A1 * | 10/2014 | Baron, Jr. | H04N 7/15 |
| | | | | 348/14.08 |
| 2015/0302664 | A1 * | 10/2015 | Miller | G06F 3/012 |
| | | | | 345/633 |
| 2015/0356781 | A1 * | 12/2015 | Miller | G06T 15/10 |
| | | | | 345/633 |
| 2016/0342310 | A1 * | 11/2016 | Schupak | G06F 16/68 |
| 2017/0195266 | A1 * | 7/2017 | Moyers | H04L 51/216 |
| 2018/0184140 | A1 * | 6/2018 | Danker | H04N 21/4758 |
| 2018/0309705 | A1 * | 10/2018 | Stahl | H04L 51/10 |
| 2019/0377474 | A1 * | 12/2019 | Neeter | G02B 27/017 |
| 2020/0219323 | A1 * | 7/2020 | Varshney | H04L 51/52 |
| 2021/0097745 | A1 | 4/2021 | Monroy-Hernandez et al. | |
| 2021/0258513 | A1 * | 8/2021 | Fieldman | G11B 27/036 |
| 2021/0349952 | A1 * | 11/2021 | Moyers | G06F 16/24578 |
| 2022/0109810 | A1 * | 4/2022 | Kancharlawar | H04N 7/157 |

OTHER PUBLICATIONS

PCT/US2022/042908 , "International Preliminary Report on Patentability", Mar. 21, 2024, 6 pages.
PCT/US2022/042908 , "International Search Report and Written Opinion", Mar. 1, 2023, 8 pages.

* cited by examiner

150

102

PROCESSING ENGINE

RECEIVING MODULE
152

VIRTUAL BACKGROUND
MODULE
154

USER INTERFACE MODULE
156

COMPOSING MODULE
158

RECEIVE METADATA ABOUT A CHAT SESSION — 210

DETERMINE VIRTUAL BACKGROUND — 212

DISPLAY SPATIAL CHAT USER INTERFACE, INCLUDING DETERMINED VIRTUAL BACKGROUND AND SPATIALIZED AVATARS — 214

DYNAMIC BACKGROUND SELECTION IN A CHAT INTERFACE

FIELD OF INVENTION

The present invention relates generally to digital communication, and more particularly, to systems and methods for providing dynamic background selection in a chat interface.

BACKGROUND

Digital communication tools and platforms have been essential in providing the ability for people and organizations to communicate and collaborate remotely, e.g., over the internet. In particular, there has been massive adopted use of chat platforms allowing for remote communication sessions between multiple participants. One such modality for this remote communication may be colloquially referred to as a "chat" or "messaging" session, facilitated by a chat or messaging platform (hereinafter referred to as "chat" and "chat platform", respectively). A chat platform is a tool configured to enabled internet users to remotely exchange messages. Such messages may be sent within, e.g., a chat room, a persistent chat channel, in a one-on-one conversation, or in some other configuration.

Chat interfaces within such platforms have generally laid out messages in a visually linear fashion, from top to bottom. For example, a first message from Participant 1 appears, then below it, a second message from Participant 2. A third message then appears from Participant 1, replying to Participant 2, and so on. A small avatar, such as a rounded image of the participant or simply a letter representing the participant's name, may appear next to the messages indicating whether Participant 1 or Participant 2 has sent a particular message.

BRIEF DESCRIPTION OF THE DRAWINGS

The present invention relates generally to digital communication, and more particularly, to systems and methods providing for dynamic alteration of notification preferences within a chat platform.

The present disclosure will become better understood from the detailed description and the drawings, wherein.

DETAILED DESCRIPTION

Figure 1A:
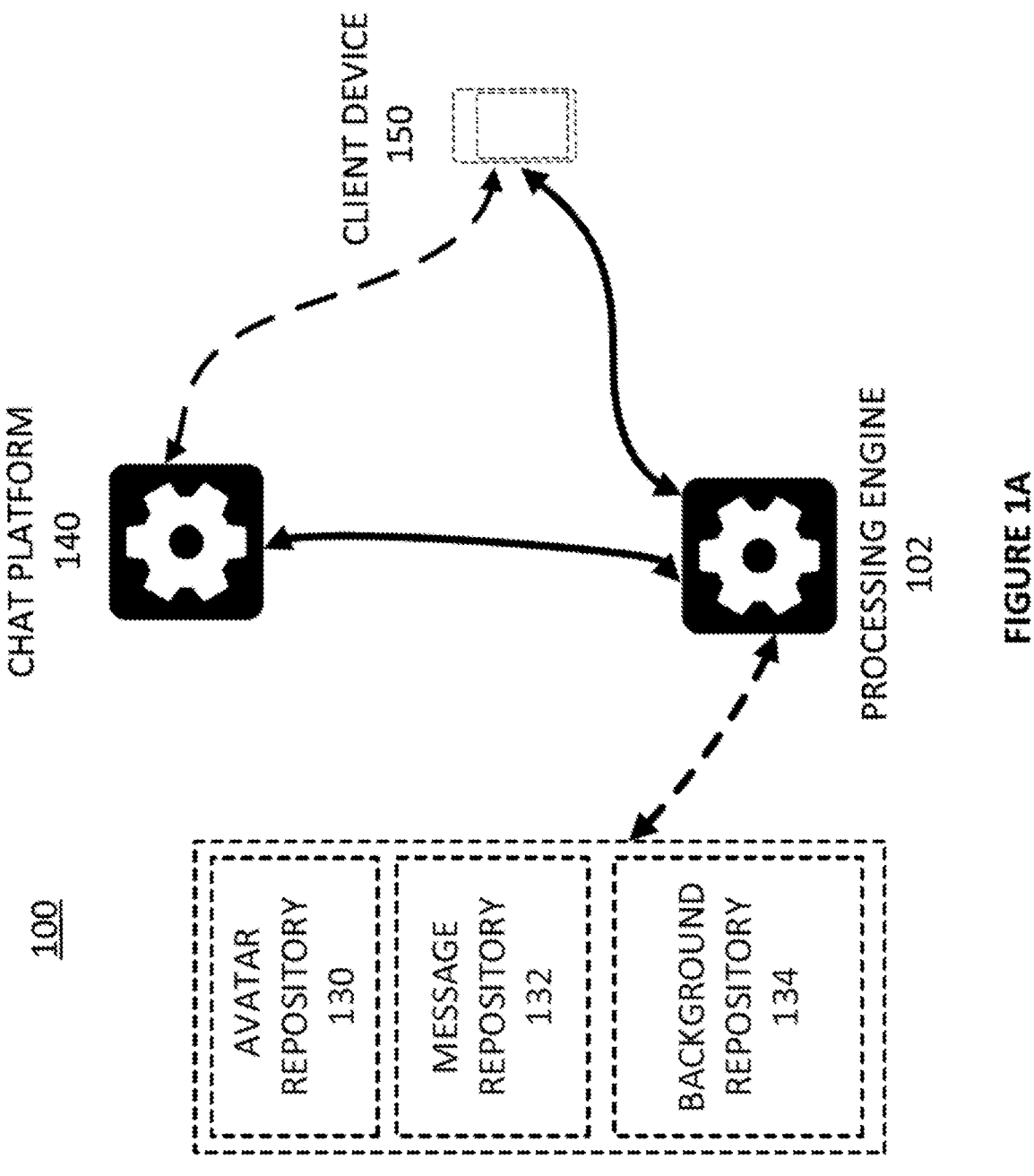
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

As users increasingly work from home and collaborate remotely, sometimes rarely or never meeting their colleagues in person, a sense of connection within chat platforms becomes more and more essential. One criticism levied against these typical chat experiences is that they are lacking a sense of connection. The typical chat experience enabled by a chat platform today can be seen as an endless stream of text, which can feel impersonal to many users. Since the only component binding the experience together is a text stream of messages, there is no sense of connectedness felt with one's team or collaborators, and a sense of community is lacking. A group that works together should feel connected, and that sense of connection is missing from the current chat experience.

Thus, there is a need in the field of digital communication tools and platforms to create new and useful systems and methods for providing dynamic background selection in a chat interface in order to humanize the chat experience, enhance live conversation, and provide a sense of place, connectedness, and community during the chat experience.

Such systems and methods can provide a visual representation of a chat session with dynamically selected backgrounds, upon which spatialized avatars can be displayed with spatialized locations and groupings, rather than the traditional linear chat view described above. A virtual background is dynamically selected according to background selection criteria as well as received metadata about the chat session, and then avatars representing the participants are positioned spatially throughout the length and width of the determined background, appearing overlaid on top of the background.

The invention overcomes the existing problems by creating a dynamic sense of place as well as positioning of participants within that place, with messages appearing in a non-linear fashion, tied to the spatialized avatars of the participants rather than a single timeline depicting messages from top to bottom. A deeper sense of connection and community can be established by, for example, the familiarity of a place the participants can return to for recurring meetings, and in some cases, the same positions or locations for participants within that place, such as in an office environment where team members are all seated in the same workspace arrangement each workday. Many other possibilities and configurations can exist. The spatial chat view can also enable a feeling of a live, informal chat conversation with other participants to a greater extent than traditional chat interface paradigms. In some embodiments, older chat messages fade away over time or as they are replaced by other messages, rather than appearing on-screen for a longer period, leading to a more active, in-the-moment chat experience.

In one embodiment, a method provides dynamic background selection in a chat interface. First, the system receives metadata about a chat session comprising a number of participants. The system then determines a virtual background based on one or more background selection criteria and at least a subset of the metadata about the chat session. Finally, the system displays, for each of the participants in the chat session, a spatial chat user interface (UI), the spatial chat UI including the determined virtual background, with one or more spatialized avatars overlaid on the virtual background and positioned spatially within it.

Further areas of applicability of the present disclosure will become apparent from the remainder of the detailed description, the claims, and the drawings. The detailed description and specific examples are intended for illustration only and are not intended to limit the scope of the disclosure.

I. Exemplary Environments

FIG. 1A is a diagram illustrating an exemplary environment in which some embodiments may operate. In the exemplary environment 100, a user's client device 150 is connected to a processing engine 102 and, optionally, a chat platform 140. The processing engine 102 is connected to the chat platform 140, and optionally connected to one or more repositories and/or databases, including, e.g., an avatar repository 130, message repository 132, and/or a background repository 134. One or more of the databases may be combined or split into multiple databases. The user's client device 150 in this environment may be a computer, and the chat platform 140 and processing engine 102 may be applications or software hosted on a computer or multiple computers which are communicatively coupled via remote server or locally.

The exemplary environment 100 is illustrated with only one client device, one processing engine, and one chat platform, though in practice there may be more or fewer additional client devices, processing engines, and/or chat platforms. In some embodiments, the client device(s), processing engine, and/or chat platform may be part of the same computer or device.

Figure 2:
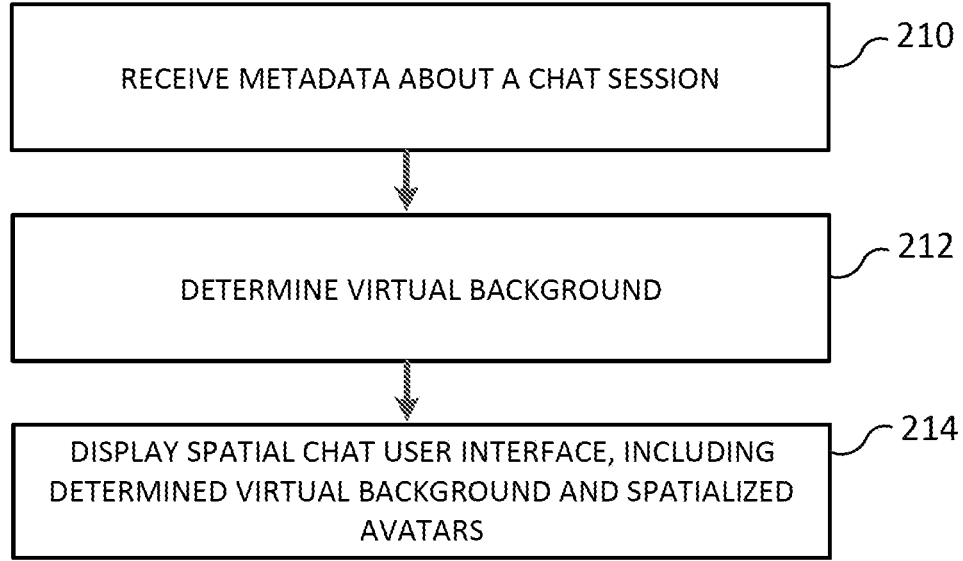
FIG. 2 is a flow chart illustrating an exemplary method that may be performed in some embodiments.

In an embodiment, the processing engine 102 may perform the exemplary method of FIG. 2 or other method herein and, as a result, provide a spatial chat view within the chat platform. In some embodiments, this may be accomplished via communication with the user's client device, processing engine, chat platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The user's client device 150 is a device with a display configured to present information to a user of the device. In some embodiments, the client device presents information in the form of a visual UI with multiple selectable UI elements or components. In some embodiments, the client device 150 is configured to send and receive signals and/or information to the processing engine 102 and/or chat platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or chat platform 140 may be hosted in whole or in part as an application or web service executed on the client device 150. In some embodiments, one or more of the chat platform 140, processing engine 102, and client device 150 may be the same device. In some embodiments, the user's client device 150 is associated with a first user account within a chat platform, and one or more additional client device(s) may be associated with additional user account(s) within the chat platform.

In some embodiments, optional repositories can include one or more of an avatar repository 130, message repository 132, and/or background repository 134. The optional repositories function to store and/or maintain, respectively, spatialized avatars corresponding to participants of a chat session; messages sent by participants within the chat session; and virtual backgrounds to be used within chat sessions. The optional database(s) may also store and/or maintain any other suitable information for the processing engine 102 or chat platform 140 to perform elements of the methods and systems herein. In some embodiments, the optional database(s) can be queried by one or more components of system 100 (e.g., by the processing engine 102), and specific stored data in the database(s) can be retrieved.

Chat platform 140 is a platform configured to facilitate communication between two or more parties, such as within a real-time conversation. A chat session within the chat platform 140 may be, e.g., a one-time chat session that will be inaccessible once the participants leave or the session ends, or it may be a persistent chat channel that remains accessible for a set of participants regardless of any one participant leaving or entering. The communication session may be, e.g., one-to-many (e.g., a participant engaging in messaging with multiple attendees), one-to-one (e.g., two friends messaging with one another), or many-to-many (e.g., multiple participants messaging with each other in a group chat setting).

In some embodiments, the chat platform 140 may be connected to, integrated with, or part of a communication platform. In some embodiments, the communication platform is provided so that video, audio, or audiovisual communication may be configured to occur alongside chat within a single session. In some embodiments, there may be one or more separate chat sessions and one or more separate audio and/or video sessions, but some integration may occur between voice and chat sessions. For the sake of readability, if the chat platform 140 is part of or integrated with a communication platform in some way, this application will refer to this integration or combination as simply a chat platform.

Figure 1B:
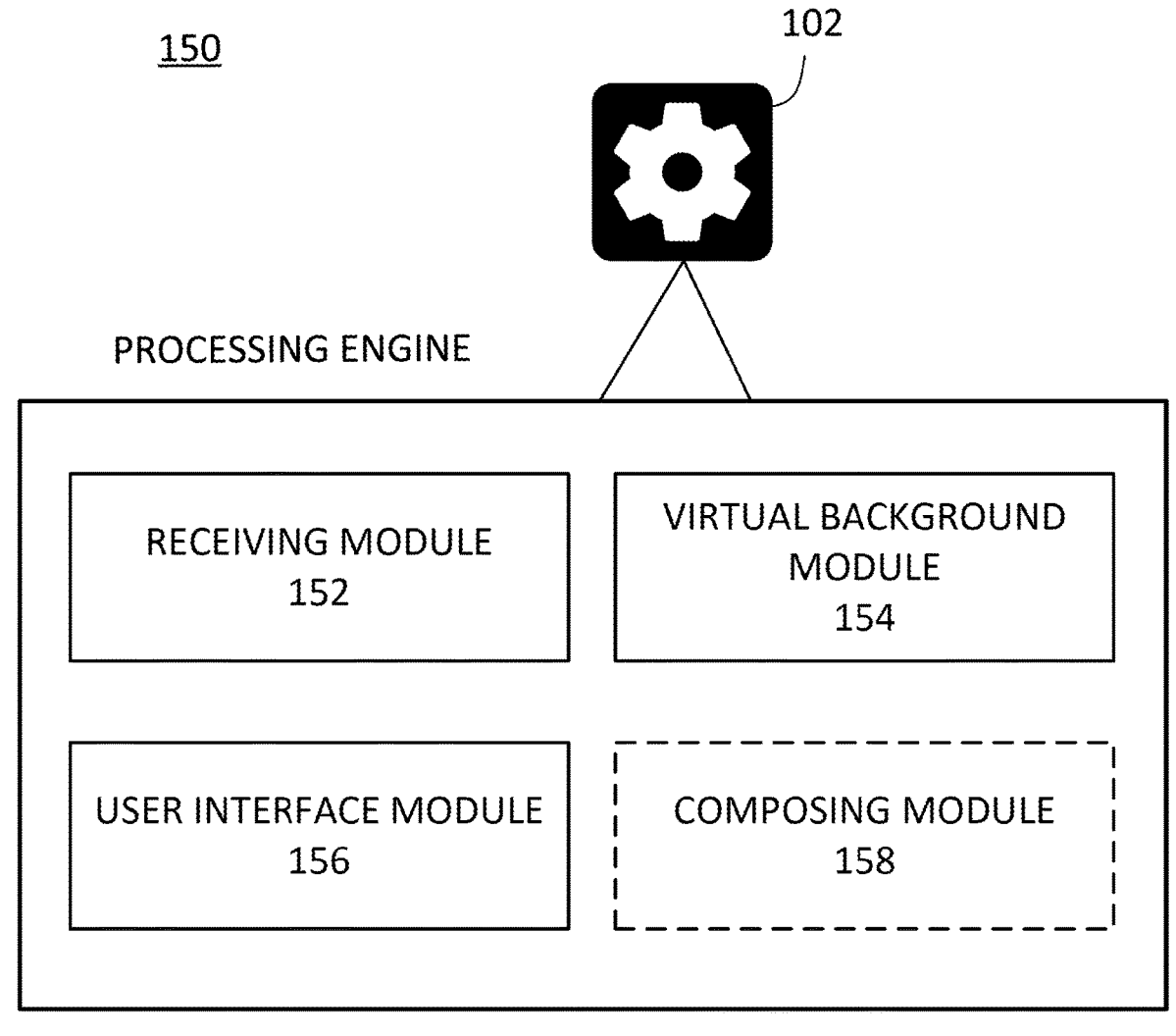
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Receiving module 152 functions to receive metadata about a chat session with a number of participants.

Virtual background module 154 functions to determine a virtual background based on one or more background selection criteria and the metadata about the chat session.

User interface module 156 functions to display, for each of the number of participants within the chat session, a UI consisting of the determined virtual background and spatialized avatars overlaid spatially within it.

Optional composing module 156 functions to configure the messaging composing component to be displayed within the UI.

The above modules and their functions will be described in further detail in relation to an exemplary method below.

II. Exemplary Method

FIG. 2 is a flow chart illustrating an exemplary method that may be performed in some embodiments.

At step 210, the system receives metadata about a chat session that includes a number of participants. The metadata is received from a chat platform. In various embodiments, the metadata can be retrieved from the chat platform once the chat session is generated within the chat platform, can be sent from the chat platform upon the session being generated, can be sent upon the chat session being scheduled for a future time, can be sent upon the chat session starting, or can otherwise be sent during relevant moments or upon relevant conditions with respect to the chat session.

In some embodiments, a chat session is any form of participants communicating with one another, whether that communication takes the form of, e.g., a one-on-one chat between two participants or a chat with more than two participants. In some cases, a chat session may be a session which occurs through a chat channel, i.e., a virtual venue within the chat platform for persistent conversations between participants, wherein the venue and session are not confined to a set time after which they are terminated, but rather remain open for a longer period of time as participants enter and leave, or become active or inactive. In some cases, a chat session may be a session which occurs through an in-meeting chat. For example, a video meeting may take place between participants. As part of that video meeting, a chat session may be opened up alongside the video, and participants of the video meeting can chat with one another in a chat format during the video meeting. Other possibilities and configurations for chat sessions can be contemplated.

In various embodiments, the metadata about the chat session can include one or more of, e.g., a chat session name, participants to the chat session, an administrator, host, or other individual with managing permissions, determined or received subject matter about the chat session, organizational department, assigned project, geolocational data, or any other relevant data about the chat session and/or its participants.

In some embodiments, a least a subset of the metadata is retrieved from one or more client devices associated with the plurality of participants. For example, the client device for a participant may reveal a geolocation of that participant, whether the participant is active and/or available, the name and/or length of a meeting the user is currently in, or other pieces of metadata relevant to a chat session and/or its participants.

At step 212, the system determines a virtual background based on one or more background selection criteria and at least a subset of the metadata about the chat session. A virtual background may consist of visual media, such e.g., an image, video, presentation document (e.g., presentation slides), word processor document, PDF document, animated image, web site, or interactive interface.

In some embodiments, the virtual background is prespecified, with the background selection criteria being a prespecified default media background. For example, the system may automatically default to displaying a solid grey background, a default image of an office floor plan or classroom, or some other image or visual media. In some embodiments, the virtual background was previously selected by an administrator, host, or other designated individual for a previous instance of the chat session or similar chat session, such as when a recurring chat session is established. In some embodiments, the virtual background is dynamically generated in real time based on one or more background selection criteria and the retrieved metadata.

In some embodiments, selection criteria for the background may include a prespecified list of calendar events. For example, noteworthy calendar events such as national holidays may trigger the system to determine a virtual background which is appropriately themed for that holiday (for example, Christmas, Thanksgiving, or other holidays for participants within the United States).

In some embodiments, the virtual background is selected by an administrator, host, or other designated individual with permission to manage the chat session. In some embodiments, the media background is received as a selection from the first user or one of the additional users from a pre-defined set of media backgrounds. In some cases, a user may upload or otherwise retrieve a virtual background from the user's client device or an external source, or generate a virtual background themselves, then import it into the chat platform. An administrator may, for example, decide to upload an overhead floor plan or layout of an office space, and participants may all be able to position their avatars at their desks within this virtual office space.

In some embodiments, an administrator, host, or other designated individual with permission may change or alter the virtual background. For example, in the middle of a chat session, a host participant may decide to swap the virtual background for a different virtual background. This new virtual background can then be shown as a replacement, and participants can position their avatars within the new virtual background. In some embodiments, the background selection criteria and metadata can be used to dynamically modify or replace the virtual background in real time or substantially real time during the chat session. In some embodiments, such dynamic modification or replacement of the virtual background can occur based on one or more text-based or non-text-based chat messages within the chat session (for example, a particular emoji such as a heart emoji may dynamically alter the background by the system displaying a brief animated swirl of hearts in the background).

In some embodiments, the background selection criteria includes a session type, such as, e.g., a one-on-one chat, a one-to-many chat, a many-to-many chat, a persistent chat channel, a one-time chat during a video meeting, or other potential session types.

In some embodiments, the background selection criteria includes the availability status of the participants, as will be described in further detail below.

At step 214, the system displays a spatial chat user interface ("UI") with the determined virtual background and spatialized avatars. The system displays this spatial chat UI for each of a number of participants within a messaging session (i.e., chat session). Each participant will be capable of viewing the spatial chat UI via a client device (e.g., client device 150 from FIG. 1) associated with that participant. The participant interfaces with the chat session via this client device, within a chat platform which facilitates the chat session.

The system displays one or more spatialized avatars as part of the spatial chat UI. Each of the spatialized avatars is a visual UI component within the spatial chat UI. Each spatialized avatar is a representation of one of the participants, and appears overlaid on the virtual background. Each of the spatialized avatars is positioned in a spatialized fashion throughout the length and width of the virtual background. In this way, each of the avatars representing participants can be positioned in a space within the virtual background. For example, if the virtual background is an office plan for a group of coworkers, then the coworkers would all have avatars representing themselves, and these avatars can be positioned in their actual work locations within the office space. Similar, a classroom where students are all seated within a fixed seating arrangement can be represented, with spatialized avatars being positioned at their seats corresponding to the participant students, with the teacher positioned at the front of the classroom. In some embodiments, different positions of avatars may indicate that the participants are working from home or working within a particular office, for example, or some other split between or categorization of participants may be indicated based on the positioning. In some embodiments, avatars can be positioned within different virtual rooms within the virtual background, indicating different conversational spaces or breakout rooms for communicating with a subset of the participants. In some embodiments, different rooms within the virtual background can be assigned different meanings or assigned to different meetings, such that avatars may be automatically repositioned to those rooms based on participating in certain meetings or in other contexts.

In some embodiments, the spatial avatars may be represented as circles or rounded images, although any visual design for avatars may be contemplated. In some embodiments, users may upload a selected image of themselves, which is displayed as their avatar. For example, a rounded circle with the face of a participant may be appear within a spatial chat UI. In some embodiments, administrators or those with managing permissions for the chat session may be able to upload images of participants to appear within their avatars. In some embodiments, images of participants may be automatically retrieved from a company database or directory. In some embodiments, spatialized avatars may be three-dimensional avatars representing the participant in some way, e.g., either realistically or in some other way, such as via a cartoon depiction. In some embodiments, the avatar may be a two-dimensional or three-dimensional avatar the participant can design themselves from a set of options and/or slider components for selecting features and parameters (such as through an avatar building interface, where a participant can select, e.g., a hairstyle, hair color, facial shape, clothing, and more). Many other such possibilities may be contemplated for the visual design of the spatialized avatars.

In some embodiments, the system displays a message composing component as part of the spatial chat UI. The message composing component includes UI elements which allow a participant to submit a text-based message, and/or potentially other content to be sent as communications within the chat and displayed for participants within the chat session. In various embodiments, the message composing component can consist of one or more of, e.g., a message text field, a message submit button, a screenshot capturing component, a file uploading component (for uploading, e.g., a still image, an animated image, a PDF document, an audio file, or any other file), a component for recording an audio message to be sent within the chat session, and a component for sharing a non-text-based expression, such as an emoji or reaction. In some embodiments, the message composing component is a separate window or component within the spatial chat UI. An example of a message composing component will be discussed further below with respect to FIG. 3A.

In some embodiments, prior to displaying the UI, the system displays a non-spatial chat UI. For example, a linear, non-spatial chat where text messages are shown from top to bottom, without a virtual background or spatialized avatars, may be displayed. A participant may then opt, within this interface, to toggle to a spatial chat view with spatialized avatars. The UI is then replaced with a spatial chat UI as described herein. In some embodiments, participants may have the option to toggle back and forth between a spatial chat UI and a non-spatial chat UI at will, and the change is implemented in real-time, such as during a chat session.

In some embodiments, the system displays chat bubbles corresponding to messages sent by a subset of the participants. The chat bubbles are displayed such that they appear adjacent to the spatialized avatars representing those participants. In some embodiments, the messages are submitted by the participants through their interactions with the messaging composing component of the spatial chat UI seen by the participants.

In some embodiments, the chat bubbles appear as e.g., bounded rectangles with rounded edges to present the appearance of a "bubble" which encapsulates the message. In other embodiments, such a "bubble" appearance may not be necessary for a chat bubble, but rather any visual design to encapsulate a message within a bounded visual element or component is displayed. In some cases, for example, a chat bubble may not have rounded edges, may be a circle instead of a rectangle, may have no visual border or boundary, may be transparent or semi-transparent, or any of a number of other visual possibilities.

In some embodiments, the system receives a message from a participant, via the message composing component of the spatial chat UI that the participant is interacting with through their client device. The system displays the message within a chat bubble, which appears adjacent to the spatialized avatar corresponding to that participant. One example of a chat bubble is illustrated in FIG. 3C, which is described in detail below.

In some embodiments, chat may be audio-only between some or all of the participants. In some embodiments, for example, a voice channel may be enabled, and rather than chat bubbles appearing, an audio-based conversation can be provided between participants with no text messages present. In some embodiments, a link to join an ongoing call or meeting may be provided and upon engaging with the link, a participant is routed to that call or meeting to participate.

In some embodiments, a participant may reply to a message sent by another participant. In some embodiments, a participant using the spatial chat UI may hover over a chat bubble within the UI, and a submenu may appear allowing the user to choose between various elements, such as, e.g., a message reply element and an emoji reply element. If the participant selects the message reply element, a message reply field is displayed, allowing the user to submit a message. Upon submitting the message, it appears as a reply to the message within the chat bubble. In some embodiments, the reply appears as a message that is in response to the original message. In some embodiments, this may be a threaded reply, wherein the message branches into a set of one or more replies to the message. In some embodiments, a reply message may simply be displayed as any other message, but some indicator or notification that a particular participant is being responded to may appear (for example, an "@" symbol may appear in front of a participant's name, such as "@Hana Song", representing that Hana Song has been replied to. The participant Hana Song may additionally get a notification, if such a notification is configured to be enabled within that participant's settings and preferences for the chat session.

In some embodiments, while a participant is typing a message into the message composing field within their spatial chat UI, the system will display a chat bubble adjacent to the spatialized avatar for that participant, indicating that the participant is currently typing a message. For example, a chat bubble displaying an animated, moving ellipses (" . . . ") may appear within a chat bubble, indicating that the participant is currently typing.

In some embodiments, the system receives a selection of an emoji, reaction, or some other non-text-based visual communication from a participant via the message composing component. In some cases, this emoji, reaction, or other communication appears within a chat bubble, as would any text-based message. In other cases, it may be displayed differently from a text-based message. For example, in some embodiments, a selected emoji may appear adjacent to the spatialized avatar in question, without being encapsulated within a chat bubble. In some embodiments, the emoji may be animated, have some sparkle or other animated effect in conjunction with the emoji itself, or otherwise be displayed in a way that calls attention to that participant reacting to something within the chat session, or expressing themselves in some way other than through text. In some embodiments, such emojis or reactions may also be sent as replies to other messages, and may appear within a threaded reply space a message in a special way (e.g., animated or with some accompanying effect). In some embodiments, rather than appearing adjacent to the avatar, the emoji may appear, for example, at the top, bottom, center, or side of the spatial chat UI, within a special frame or window, or otherwise in some way decoupled from the spatialized avatar.

In some embodiments, the system determines an availability status for each of the multiple participants. In some embodiments, this determination may occur concurrently to, prior to, or after one or more other steps. An availability status represents whether the participant in question is currently available or not within the chat session. In various embodiments, unavailability may mean one or more of, e.g., the participant self-identifying as busy or unavailable (such as selecting a UI component to indicate that they are busy or away from their client device), the system identifying that the participant is in a meeting or different chat session and unavailable, the system identifying that the participant is not present within the chat session, the system identifying that the participant has been idle and inactive within the chat session or at their client device for a period of time, the system identifying that the participant is on paid time off or sick leave for the day, the participant indicating that they are in "do not disturb" mode and should not be contacted within the chat session or receive notifications pertaining to it, or any other similar indication that the participant is unable to currently participate in the chat session or is not viewing messages or participating at the moment. In some embodiments, a participant can hover over or click on a participant's spatialized avatar to see a more detailed status regarding the availability of that participant, such as, e.g., the name of a meeting if the user is attending one.

In some embodiments, the availability status for each of the plurality of participants corresponds to at least the current activity level of the participant within the chat session. In some embodiments, both the current activity level and the availability of the participant within the messaging session are factors in determining an availability status.

In some embodiments, the availability status for each of the plurality of participants corresponds to some period of time of activity or inactivity. For example, the availability status may indicate that the participant was last active within the chat session 15 minutes ago. In some embodiments, the system may determine based on GPS or other locational detection on the participant's client device that the client is "out of office" for a specified location of a physical office space, for example, or other specified location, and determine unavailability based on this physical location detected for the participant.

In some embodiments, the system displays a visual indicator of availability status for each participant. In some embodiments, this displaying may occur concurrently to, prior to, or after one or more other steps. This visual indicator is displayed within or adjacent to each of the spatialized avatars. The visual indicators communicate, within the spatial chat UI, the availability status of the participants represented by the spatialized avatars.

In some embodiments, the visual indicators for availability are differentiated from one another based on different colors, different visual elements, or other visual distinguishing features. In some embodiments, the visual indicator may be an automatically generated text status, such as, e.g., "Last active 15 minutes ago", or may be a text status submitted by the participant themselves, such as, for example, "be right back in a few minutes". In some embodiments, the visual indicator may be presented as a solid circle around the border of the avatar for the participant being available, and a thatched, dashed, or semi-transparent circle around the border of the avatar for the participant being unavailable. One example of visual indicators for availability is illustrated in FIG. 3A, which is described in further detail below.

In some embodiments, the spatial chat UI may present one or more actions which can be presented based on availability status. For example, the spatial UI may present participants with the option to send a message to, start a phone call with, or start a meeting with everyone who is currently indicated to be available. In some embodiments, a host may be allowed to reposition avatars in a certain room which may be designated as a meeting room, in order to discuss something with those participants but not other participants. In such a case, the messages between those participants may not be visible to participants outside of that room.

In some embodiments, a participant interacting with the spatial chat UI may interact with one of the spatial avatars within the interface by, e.g., clicking, touching, or tapping on the avatar, depending on the preferred control input being used by the participant. In some embodiments, upon interacting with the avatar, a summary window appears for that avatar. The summary window includes one or more pieces of information about the participant represented by the spatial avatar, including one or more of, e.g., name, username or pseudonym, availability status, organizational title, profile or biographical statement, meeting currently being attended by the participant, and more.

Figure 3A:
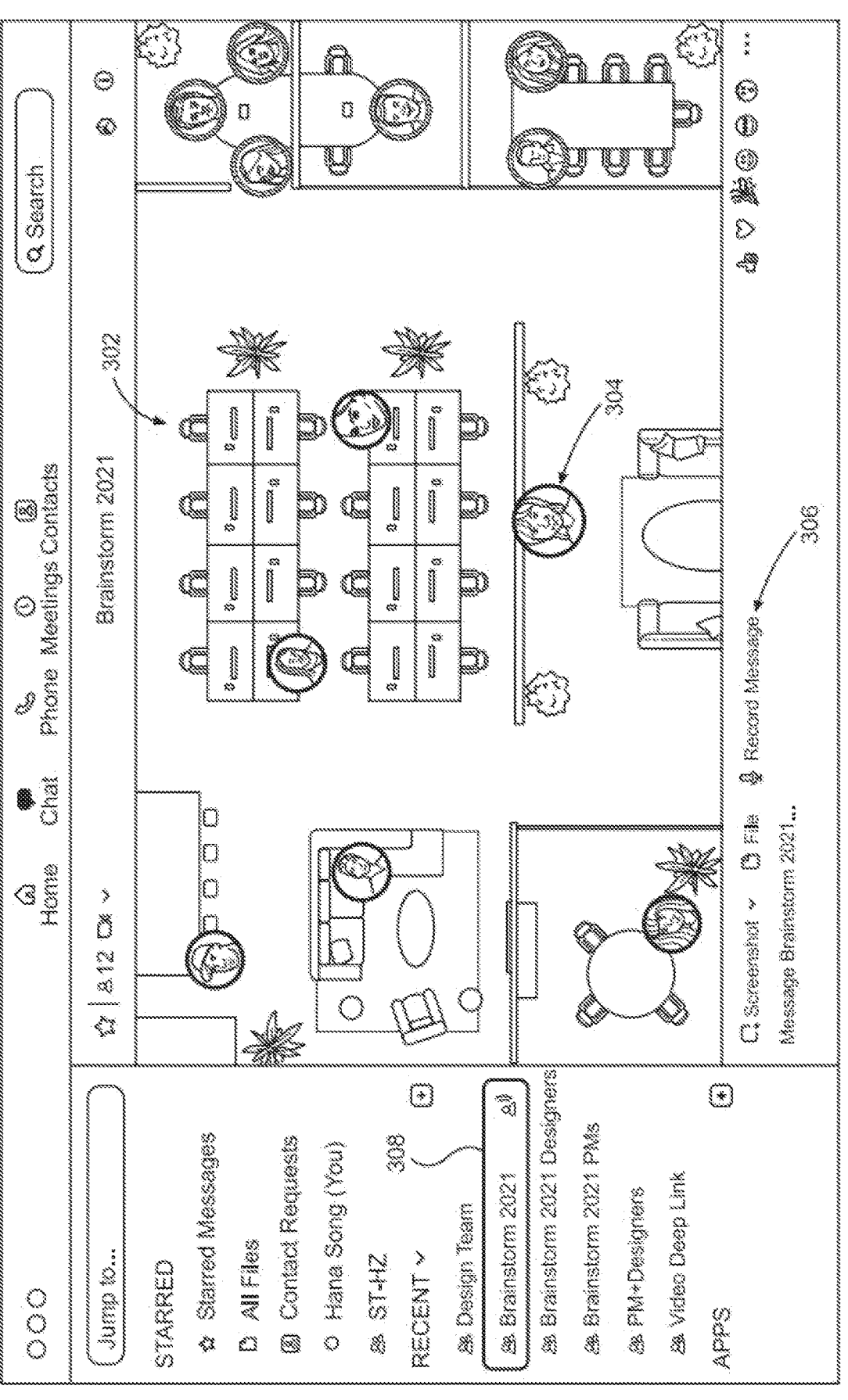
FIG. 3A is a diagram illustrating one example embodiment of a spatial chat view, according to some embodiments.

FIG. 3A is a diagram illustrating one example embodiment of a spatial chat view, according to some embodiments. The figure illustrates an example of a spatial chat UI which may be displayed for a particular participant of a chat session. In this case, the participant is named Hana Song, as shown in the sidebar UI component on the left. The main UI window shows a virtual background 302 which represents an office layout, as seen from overhead. The virtual background is dynamically selected according to background selection criteria and metadata about the chat session, as described above. For example, the background may be prespecified dynamically by the system based on context about the meeting and/or the participants.

The participant who is viewing the spatial chat UI can see her own spatial avatar 304, which represents her as a participant. In the illustrated example, her spatial avatar is slightly larger than the others. In some embodiments, this may be indicating that the avatar has just recently sent a message or is about to send a message.

Message composing component 306 is displayed as a UI component at the bottom of the interface. This component as illustrated shows a text field where the participant can enter a message to be sent within the chat session. Components are also shown for capturing a screenshot, uploading a file to be accessed by the participants, and recording a message which can be played back by participants. On the right, a participant can select an emoji to be displayed adjacent to their avatar, or the three ellipses ("...") can be selected for additional options, such as for sending other non-text-based expressions to be displayed in the spatial chat UI.

On the sidebar to the left, a chat session 308 is displayed with title, with a visual indicator that the participant is currently active and/or present in that room. Other recent chat rooms are displayed as well. The participant can select a different chat room to switch the spatial chat UI from displaying the current chat session to displaying a different one.

Additional spatial avatars are also displayed, representing the participant's coworkers within the chat session. Some of the avatars are shown with one visual indicator of availability status, indicating they are available and/or active, while other avatars have a different visual indicator, indicating they are busy and/or inactive for some time. In the illustrated example, the visual indicators shown are a solid circle around the border of the avatar for the participant being available, or a thatched circle around the border of the avatar for the participant being unavailable.

Figure 3B:
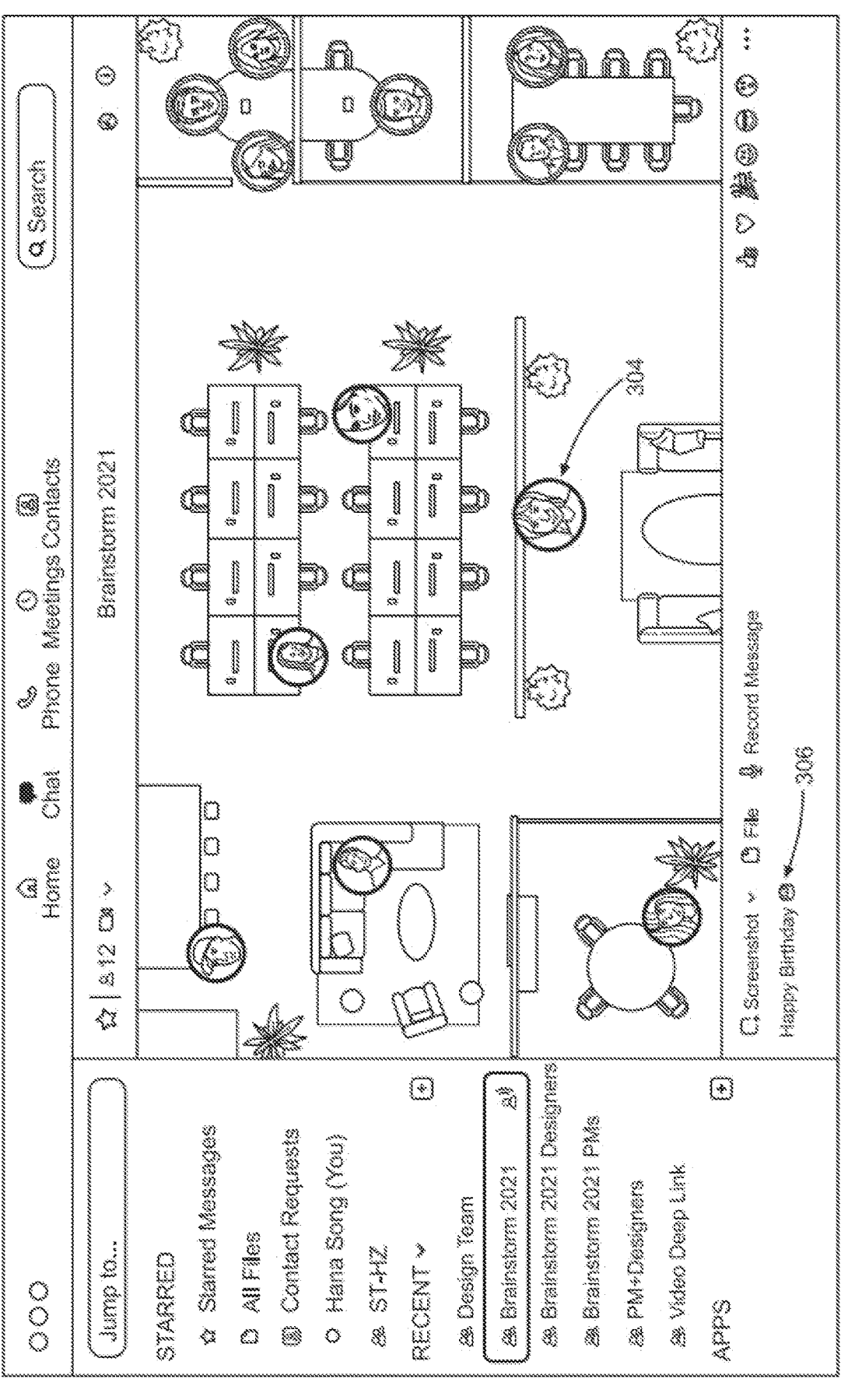
FIG. 3B is a diagram illustrating one example embodiment of entering a message into a spatial chat view, according to some embodiments.
Figure 3C:
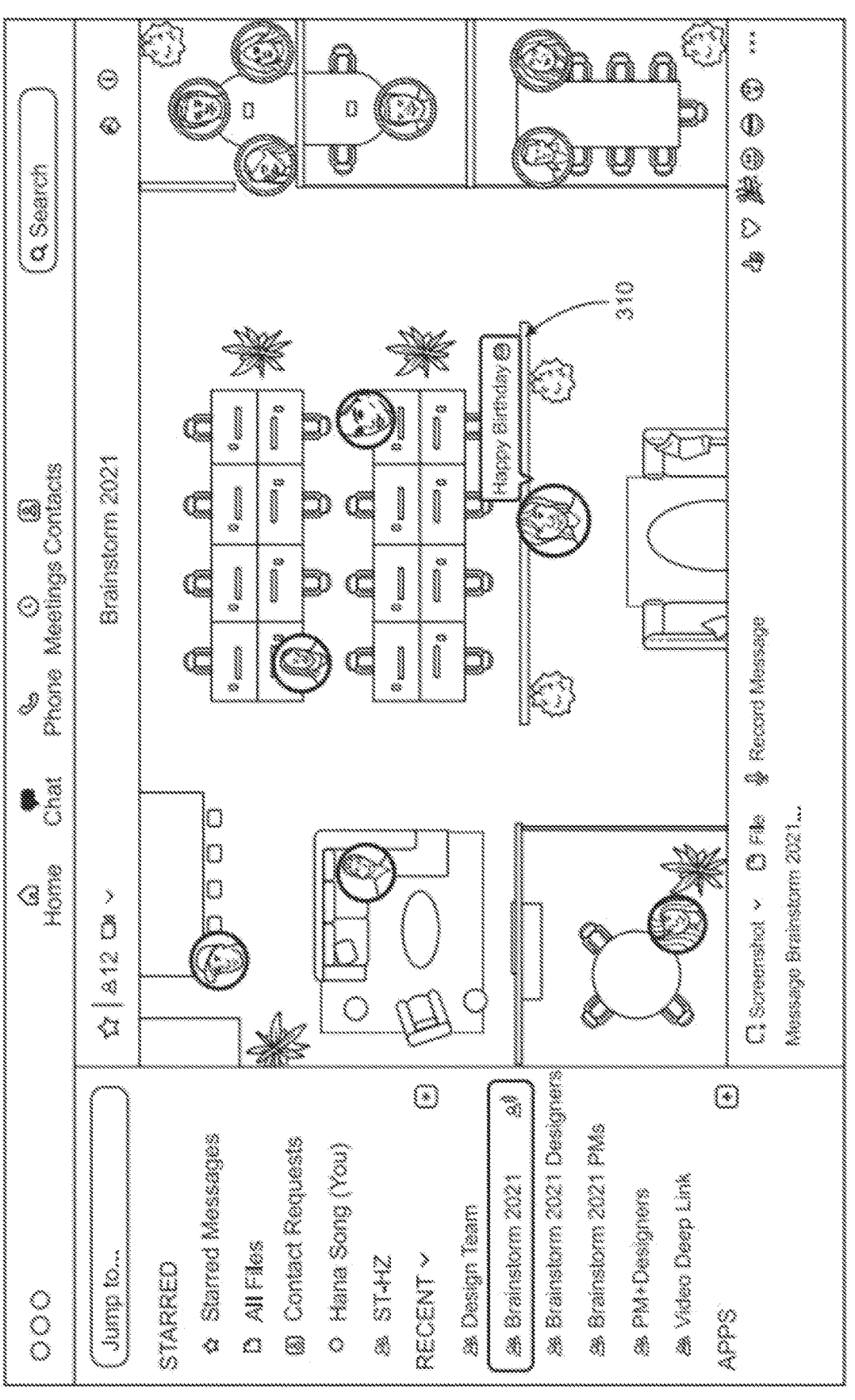
FIG. 3C is a diagram illustrating one example embodiment of a message being displayed in a spatial chat view, according to some embodiments.

FIG. 3B is a diagram illustrating one example embodiment of entering a message into a spatial chat view, according to some embodiments.

The example illustrates the same chat session and spatial chat UI as in FIG. 3A. Here, the participant has entered a message into the message field 306. The message is a mixture of text ("Happy Birthday") and a non-text emoji of a birthday cake.

FIG. 3C is a diagram illustrating one example embodiment of a message being displayed in a spatial chat view, according to some embodiments.

Here, the message from FIG. 3B has been submitted, and the participant can see that the message 310 has appeared in a chat bubble adjacent to the participant's corresponding spatial avatar within the spatial chat UI. In some embodiments, this chat bubble is designated a different color or otherwise visually demarcated to indicate that the message is from the participant herself, rather than a different participant.

Figure 3D:
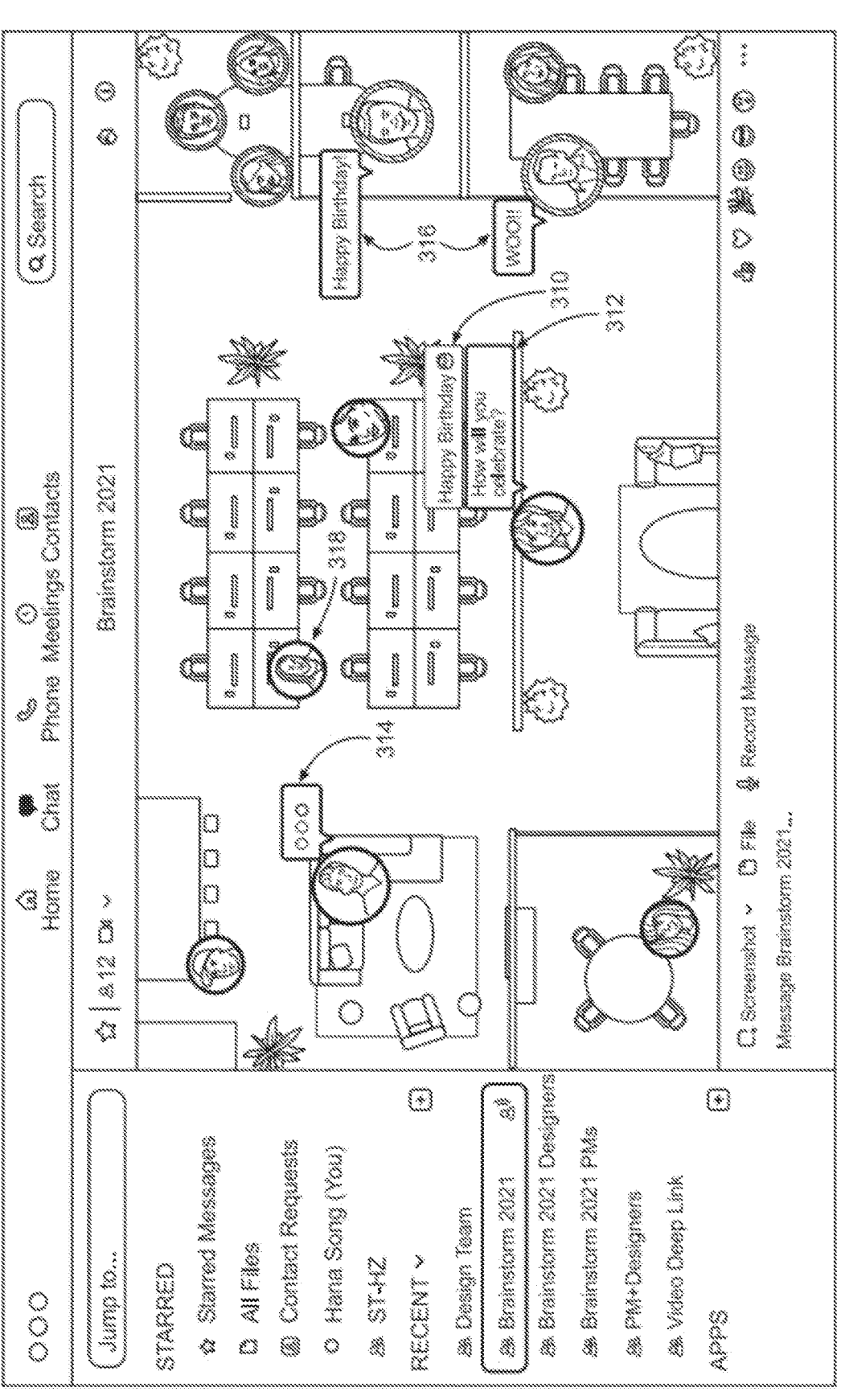
FIG. 3D is a diagram illustrating one example embodiment of multiple participants interacting in a spatial chat view, according to some embodiments.

FIG. 3D is a diagram illustrating one example embodiment of multiple participants interacting in a spatial chat view, according to some embodiments.

Figure 3E:
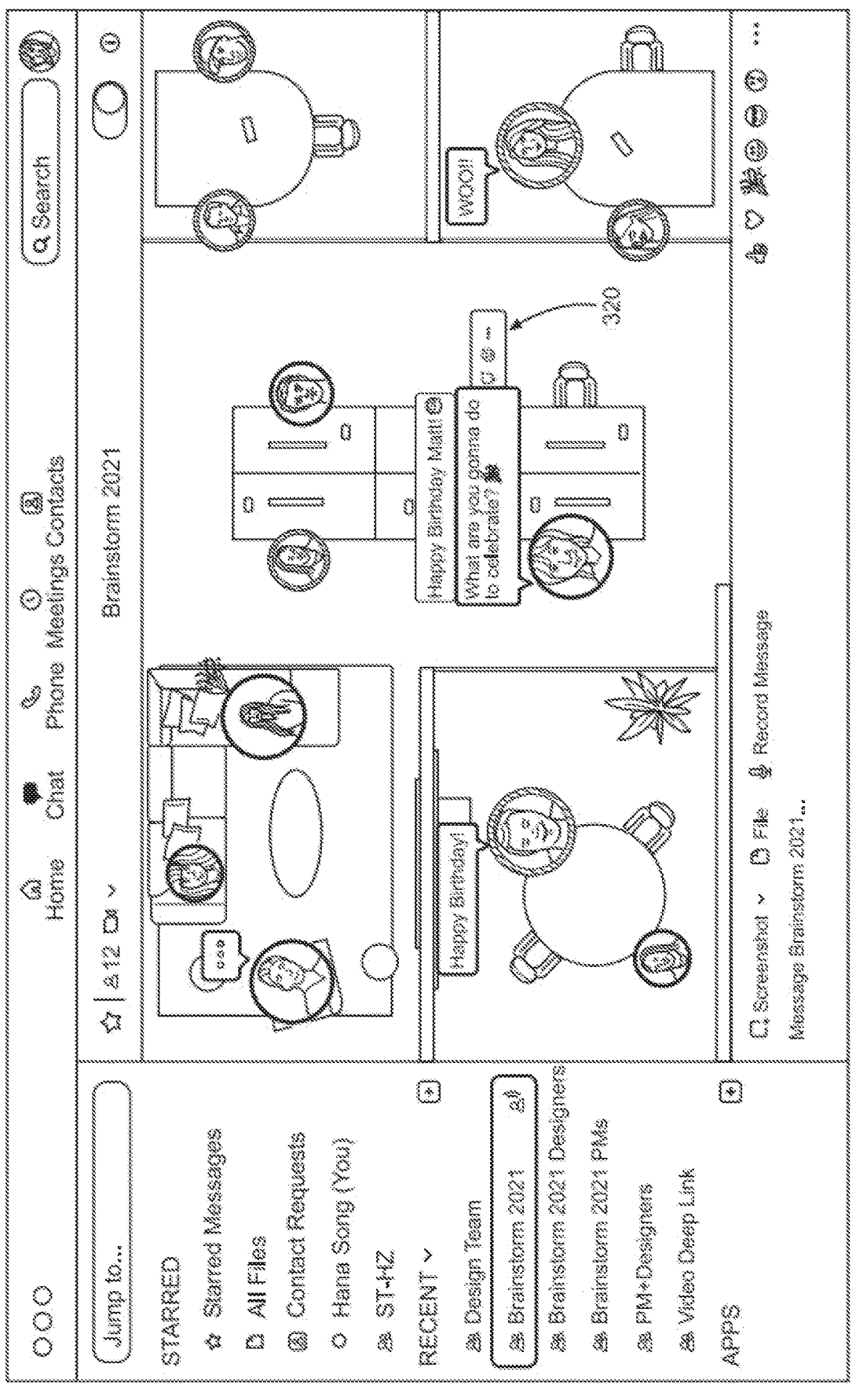
FIG. 3E is a diagram illustrating one example embodiment of a submenu for a displayed message, according to some embodiments.

In reply to the message shown in FIG. 3E, other participants within the chat have begun to respond in this illustrated example. The message 310 is still present, but has faded in appearance to indicate that it is an older message. A newer message 312 from the participant herself is displayed as a follow up, replacing the prior message 310 and moving the prior message up visually. A chat bubble 314 indicates that a participant is currently typing a message to be posted into the chat session. Additional chat bubbles 316 indicate other messages sent from participants. One participant 318 has reacted to the original message with an emoji indicating a party hat, which is displayed adjacent to the participant's spatial avatar, albeit not within a chat bubble.

FIG. 3E is a diagram illustrating one example embodiment of a submenu for a displayed message, according to some embodiments. If the participant clicks on a message within a chat bubble, an additional submenu 320 will appear adjacent to that chat bubble. The additional submenu illustrated shows UI components for a reply message, a reply emoji, and ellipses for additional options. The user may click on or otherwise interact with these components within the submenu for additional chat options.

Figure 3F:
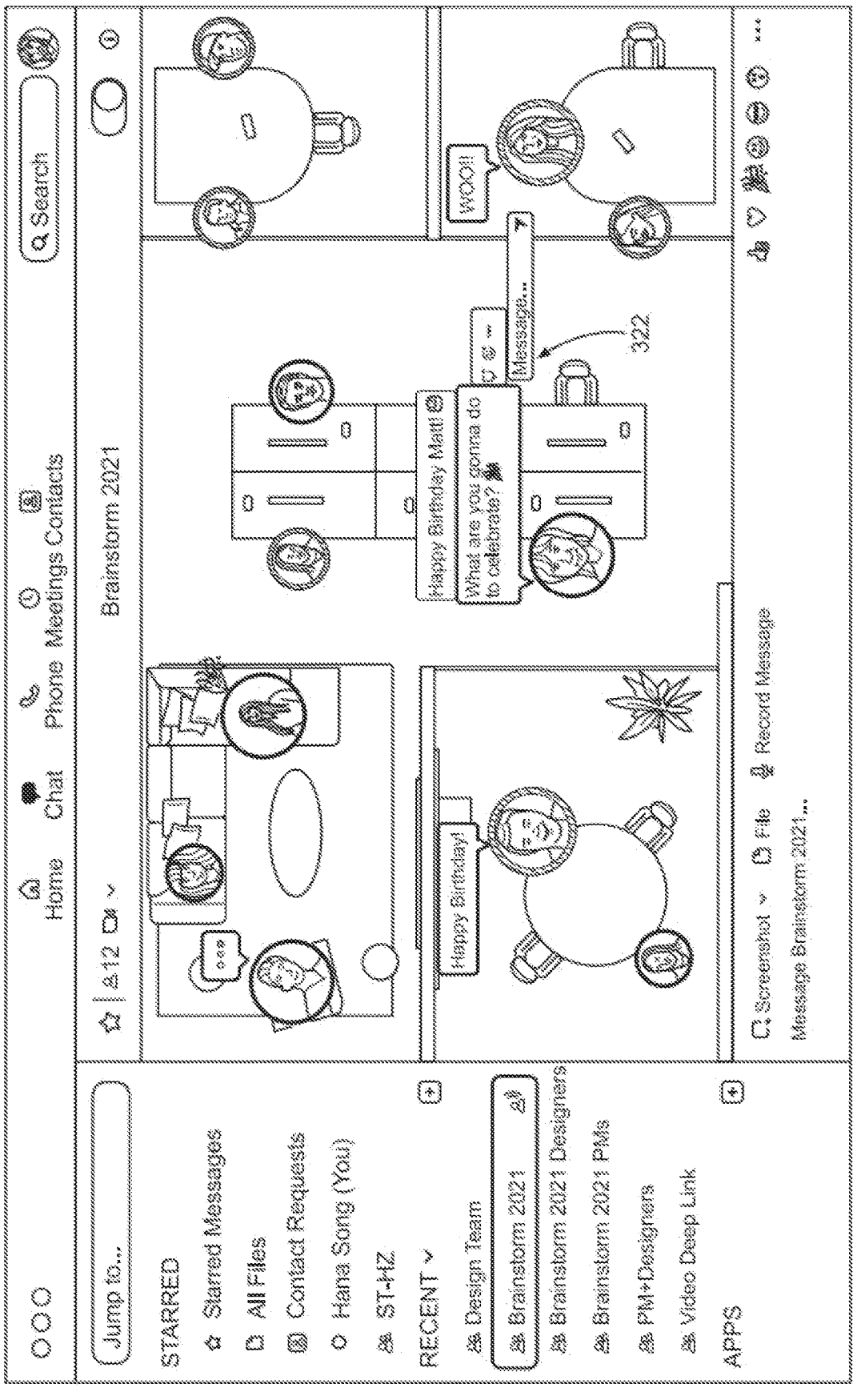
FIG. 3F is a diagram illustrating one example embodiment of a threaded reply field for a displayed message, according to some embodiments.

FIG. 3F is a diagram illustrating one example embodiment of a threaded reply field for a displayed message, according to some embodiments.

Here, the participant viewing the submenu from FIG. 3E has interacted with the reply message component. In response, the spatial chat UI displays a threaded reply text field 322 where the participant can input a message. A submit button appears at the right of this text field.

Figure 3G:
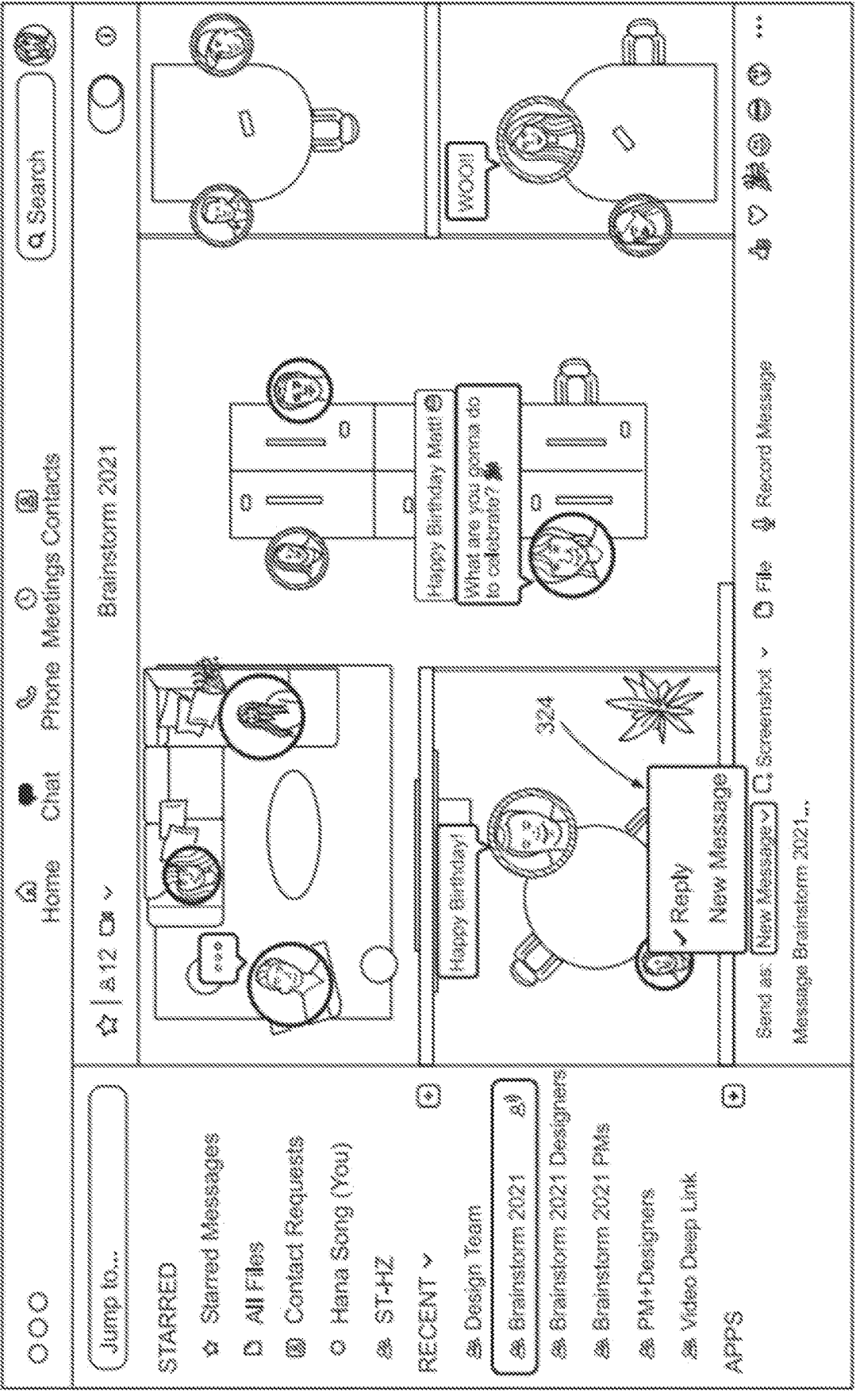
FIG. 3G is a diagram illustrating one example embodiment of selecting a message type to be sent, according to some embodiments.

FIG. 3G is a diagram illustrating one example embodiment of selecting a message type to be sent, according to some embodiments.

The participant from the previous examples has interacted with the message composing component to select a message type to be sent. The participant can select between a reply message, or a new message.

Figure 3H:
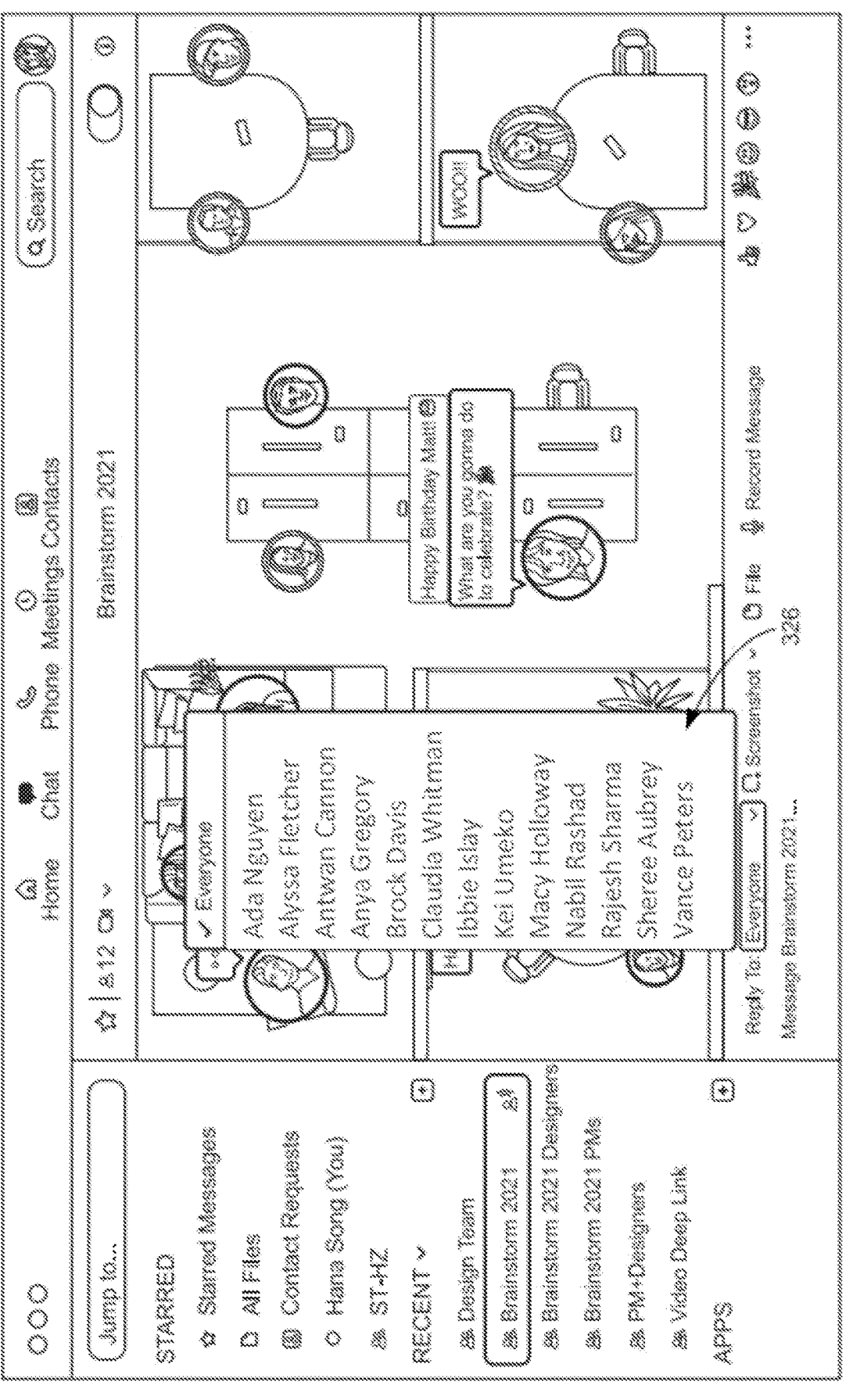
FIG. 3H is a diagram illustrating one example embodiment of selecting recipients for a reply message to be sent, according to some embodiments.

FIG. 3H is a diagram illustrating one example embodiment of selecting recipients for a reply message to be sent, according to some embodiments.

Here, the participant from FIG. 3G has selected a reply message, and a list of potential recipients is displayed. The participant can select a recipient to send a reply message to, or simply reply to everyone. If the participant selects a recipient to reply to, in some embodiments, a visual or textual mark may be indicated to show that a particular participant is being replied to. That participant may also receive a notification of some form within the chat platform, if the participant has permitted such a notification within the participant's settings and chat configuration.

Figure 4:
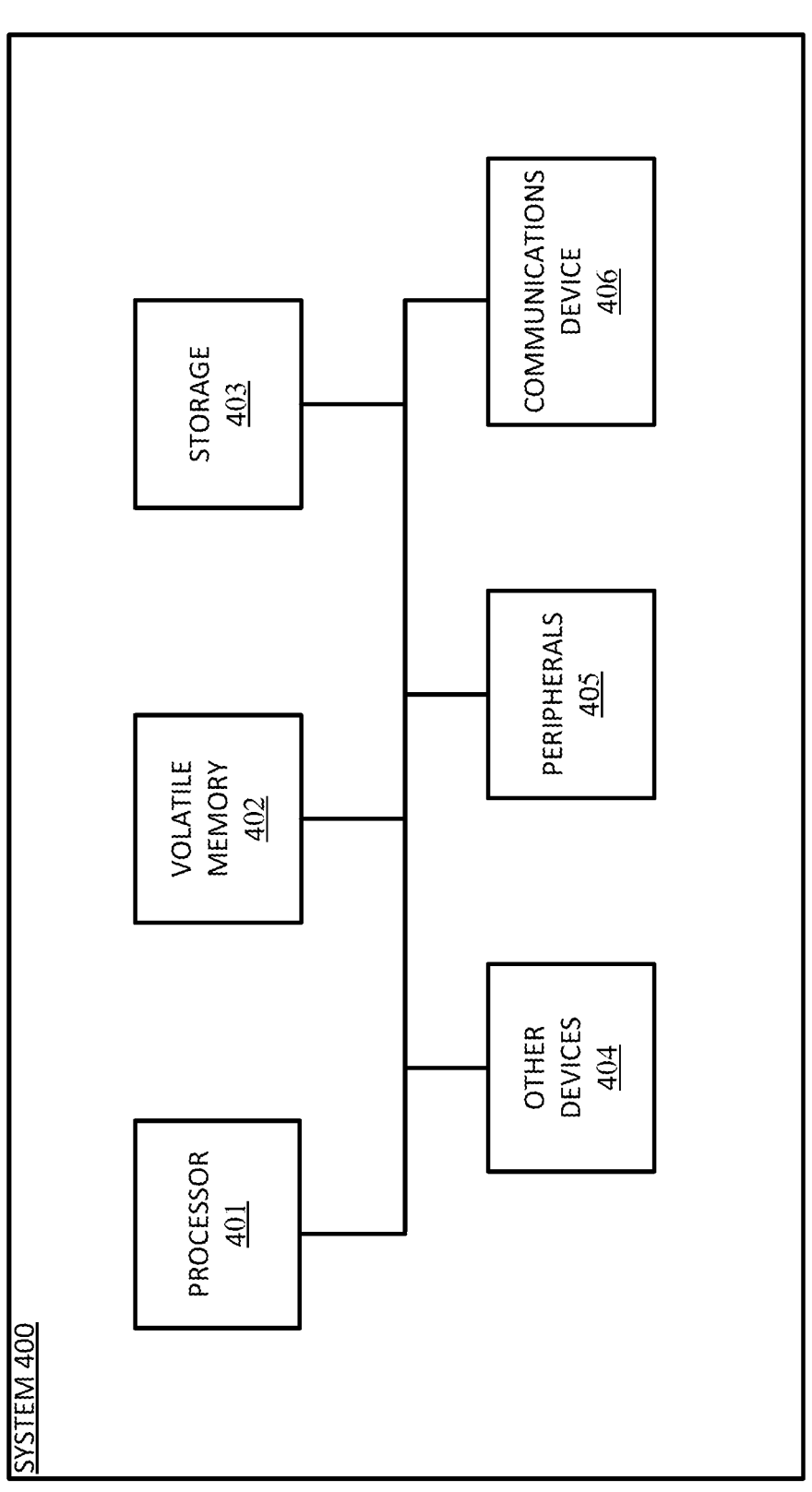
FIG. 4 is a diagram illustrating an exemplary computer that may perform processing in some embodiments.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as CD-R and DVD-R recorders/players. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for providing dynamic background selection in a chat interface, comprising:

receiving a plurality of metadata about a chat session comprising a plurality of participants, the plurality of participants exchanging a plurality chat messages;

determining a virtual background for a spatial chat user interface (UI) based on one or more background selection criteria and at least a subset of the plurality of metadata about the chat session, wherein:

the spatial chat UI comprises:

a navigation portion;

a chat portion; and the virtual background; and the one or more background selection criteria comprise at least one availability status of a participant of the plurality of participants;

receiving a fixed arrangement of avatar positions for the plurality of participants within the virtual background submitted by a host or administrator of the chat session; and displaying, for each of the participants within the chat session the spatial chat UI comprising:

one or more spatialized avatars within the virtual background, wherein each of the spatialized avatars:

is a representation of one of the plurality of participants overlaid on the virtual background; and is positioned in a spatialized fashion within the virtual background, the position of the spatialized avatar within the virtual background corresponding to the physical position of the represented participant.

2. The method of claim 1, wherein the determined virtual background is configured to be dynamically modified or replaced based on one or more of the background selection criteria and the at least a subset of the plurality of metadata about the chat session.

3. The method of claim 1, wherein the determined virtual background is configured to be dynamically modified or replaced based on one or more text-based or non-text-based chat messages within the chat session.

4. The method of claim 1, wherein the one or more background selection criteria comprises a prespecified list of calendar events.

5. The method of claim 1, the background selection criteria comprises a prespecified default background selection.

6. The method of claim 1, wherein the metadata about the chat session includes one or more of: session name, participants, an administrator, subject matter, organizational department, assigned project, and geolocational data.

7. The method of claim 1, wherein the background selection criteria comprises a session type.

8. The method of claim 1, wherein the at least a subset of the plurality of metadata is retrieved from one or more client devices associated with the plurality of participants.

9. The method of claim 1, wherein the background selection criteria comprises working locations for the plurality of participants.

10. The method of claim 1, wherein each of the spatialized avatars is associated with a visual indication of an availability status of the corresponding participant, the availability status comprising an indication of an activity level of the participant and a last active time within the chat session.

11. A communication system comprising one or more processors configured to perform operations including:

receiving a plurality of metadata about a chat session comprising a plurality of participants, the plurality of participants exchanging a plurality chat messages;

determining a virtual background based for a spatial chat UI on one or more background selection criteria and at least a subset of the plurality of metadata about the chat session, wherein:

the spatial chat UI comprises:

a navigation portion;

a chat portion; and the virtual background; and the one or more background selection criteria comprise at least one availability status of a participant of the plurality of participants;

receiving a fixed arrangement of avatar positions for the plurality of participants within the virtual background submitted by a host or administrator of the chat session; and displaying, for each of the participants within the chat session the spatial chat UI comprising:

one or more spatialized avatars within the virtual background, wherein each of the spatialized avatars:

is a representation of one of the plurality of participants overlaid on the virtual background; and is positioned in a spatialized fashion within the virtual background, the position of the spatialized avatar within the virtual background corresponding to the physical position of the represented participant.

12. The communication system of claim 11, wherein the determined virtual background is configured to be dynamically modified or replaced based on one or more of the background selection criteria and the at least a subset of the plurality of metadata about the chat session.

13. The communication system of claim 11, wherein the determined virtual background is configured to be dynamically modified or replaced based on one or more text-based or non-text-based chat messages within the chat session.

14. The communication system of claim 11, wherein the one or more background selection criteria comprises a prespecified list of calendar events.

15. The communication system of claim 11, the background selection criteria comprises a prespecified default background selection.

16. The communication system of claim 11, wherein the metadata about the chat session includes one or more of: session name, participants, an administrator, subject matter, organizational department, assigned project, and geolocational data.

17. The communication system of claim 11, wherein the background selection criteria comprises a session type.

18. The communication system of claim 11, wherein the at least a subset of the plurality of metadata is retrieved from one or more client devices associated with the plurality of participants.

19. The communication system of claim 11, wherein the background selection criteria comprises working locations for the plurality of participants.

20. A non-transitory computer-readable medium containing instructions for providing dynamic background selection in a chat interface, comprising:

instructions for receiving a plurality of metadata about a chat session comprising a plurality of participants;

instructions for determining a virtual background for a spatial chat UI based on one or more background selection criteria and at least a subset of the plurality of metadata about the chat session, wherein:

the spatial chat UI comprises:

a navigation portion;

a chat portion; and the virtual background; and the one or more background selection criteria comprise at least one availability status of a participant of the plurality of participants;

instructions for displaying, for each of the participants within the chat session the spatial chat UI comprising:

one or more spatialized avatars within the virtual background, wherein each of the spatialized avatars:

is a representation of one of the plurality of participants overlaid on the virtual background; and is positioned in a spatialized fashion within the virtual background, the position of the spatialized avatar within the virtual background corresponding to the physical position of the represented participant.

* * * * *